United States Patent
Bushelman

(10) Patent No.: US 10,703,907 B2
(45) Date of Patent: Jul. 7, 2020

(54) REINFORCED COMPOSITIONS

(71) Applicant: SOLVAY SPECIALTY POLYMERS USA, LLC, Alpharetta, GA (US)

(72) Inventor: Corinne Bushelman, Cumming, GA (US)

(73) Assignee: Solvay Special Polymers USA, LLC, Alpharetta, GA (US)

(*) Notice: Subject to any disclaimer, the term of this patent is extended or adjusted under 35 U.S.C. 154(b) by 0 days.

(21) Appl. No.: 14/899,311

(22) PCT Filed: Jun. 18, 2014

(86) PCT No.: PCT/EP2014/062834
§ 371 (c)(1),
(2) Date: Dec. 17, 2015

(87) PCT Pub. No.: WO2014/202673
PCT Pub. Date: Dec. 24, 2014

(65) Prior Publication Data
US 2016/0130441 A1    May 12, 2016

Related U.S. Application Data

(60) Provisional application No. 61/837,752, filed on Jun. 21, 2013.

(30) Foreign Application Priority Data

Sep. 19, 2013  (EP) ..................................... 13185209

(51) Int. Cl.
*C08L 81/06* (2006.01)
*C08L 79/08* (2006.01)
*C08G 73/10* (2006.01)
*C08K 7/06* (2006.01)
*C08K 7/14* (2006.01)
*C08K 7/02* (2006.01)

(52) U.S. Cl.
CPC .......... *C08L 81/06* (2013.01); *C08G 73/1053* (2013.01); *C08G 73/1071* (2013.01); *C08K 7/02* (2013.01); *C08K 7/06* (2013.01); *C08K 7/14* (2013.01); *C08L 79/08* (2013.01)

(58) Field of Classification Search
CPC ........... C08L 79/08; C08L 81/06; C08K 7/02; C08K 7/06
See application file for complete search history.

(56) References Cited

U.S. PATENT DOCUMENTS

| | | |
|---|---|---|
| 4,293,670 A | 10/1981 | Robeson et al. |
| 5,087,644 A | 2/1992 | Tsutsumi et al. |
| 5,189,115 A | 2/1993 | Melquist |
| 7,259,201 B2 | 8/2007 | Gallucci et al. |
| 8,309,637 B2 | 11/2012 | Sanner et al. |
| 8,362,114 B2 | 1/2013 | Maljkovic et al. |
| 2005/0048299 A1 | 3/2005 | Gallucci et al. |
| 2006/0084748 A1* | 4/2006 | Gallucci ................ C08K 7/04 524/494 |
| 2008/0234440 A1* | 9/2008 | Brademeyer .......... C08L 81/06 525/418 |

FOREIGN PATENT DOCUMENTS

| | | |
|---|---|---|
| CN | 102199350 A | 9/2011 |
| EP | 111327 A1 | 6/1984 |
| JP | 08283574 A | 10/1996 |
| WO | 200060009 A1 | 10/2000 |
| WO | 2009009525 A1 | 1/2009 |
| WO | 2009019241 A2 | 2/2009 |
| WO | 2012167084 A1 | 12/2012 |

OTHER PUBLICATIONS

Murphy J., in "Additives for Plastics Handbook", 2nd Edition, 2001, Chapter 5.2.3., p. 43-48—Elsevier Advanced Technology.
Hausrath R.L. et al., in "Fiberglass and Glass Technology", 2010, XIV, Chapter 5, p. 197-225—Wallenberger F.T. and Bingham P.A. (Editors).
Bora M.O. et al., "The effect of TIO2 filler content on the mechanical, thermal, and tribological properties of TiO2/PPS composites", Polymer Composites, Jun. 2, 2013 (Jun. 2, 2013), p. 1591-1599, XP055103060, ISSN: 0272-8397, DOI: 10.1002/pc.22559—Society of Plastics Engineers.

* cited by examiner

Primary Examiner — Wenwen Cai

(57) ABSTRACT

A composition [composition (C)] comprising: from 1 to 90% by weight (wt. %) of at least one a polyetherimide polymer [PEI polymer], from 5 to 94 wt. % of at least one polyphenylsulfone polymer, [PPSU polymer], from 5 to 75% wt. of at least one fibrous reinforcing filler.

15 Claims, No Drawings

REINFORCED COMPOSITIONS

CROSS-REFERENCE TO RELATED APPLICATION

This application claims priority to U.S. [provisional or non-provisional] application No. 61/837,752 filed Jun. 21, 2013 and to European application No. 13185209.7 filed Sep. 19, 2013, the whole content of each of these applications being incorporated herein by reference for all purposes.

FIELD OF INVENTION

The present invention relates to high performance reinforced polyetherimide (PEI)/polyphenylsulfone (PPSU) polymer compositions and articles made therefrom.

BACKGROUND OF THE INVENTION

There is a continuous interest in reinforced thermoplastic composite materials. Said composite materials including a polymer matrix having one or more reinforcing fillers, selected notably from fibrous and particulate fillers, dispersed throughout the continuous polymer matrix are well known. The reinforcing filler, is often added to enhance one or more mechanical properties of the polymer, such as tensile strength and the like.

Polyphenylsulfone (PPSU) polymer is a well known thermoplastic resin, recognized for instance, for its high temperature capabilities (with a glass transition temperature (Tg) of 220° C.), for its outstanding chemical resistance and for its inherent flame retardant properties.

RADEL® R is for example a polyphenylsulfone (PPSU) polymer commercially available from SOLVAY SPECIALTY POLYMERS USA, LLC. The chemical structure of a RADEL® R polyphenylsulfone is shown below.

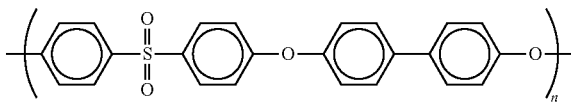

Glass reinforced PPSU polymers are also commercially available from SOLVAY SPECIALTY POLYMERS USA, LLC under the commercial names RADEL® RG-5010 and RADEL® RG-5030.

Although, the properties of PPSU polymer based materials are very attractive, there is still a need for improved reinforced PPSU polymer based compositions that can be used in some demanding applications requiring even better mechanical properties, in particular improved strength and modulus, enhanced impact properties, higher tensile elongation at break, while maintaining all the other exceptional properties of PPSU polymers.

SUMMARY OF INVENTION

The Applicant has surprisingly found that it is possible to provide reinforced PEI/PPSU compositions advantageously fulfilling the above mentioned needs, especially having said improved mechanical properties.

The invention thus pertains to a composition [composition (C)] comprising:
  from 1 to 90% by weight (wt. %) of at least one a polyetherimide polymer [PEI polymer, herein after];
  from 5 to 94 wt. % of at least one polyphenylsulfone polymer [PPSU polymer, herein after], wherein more than 50% by moles of the recurring units of said PPSU polymer are recurring units ($R_{PPSU}$) of formula (A), herein below:

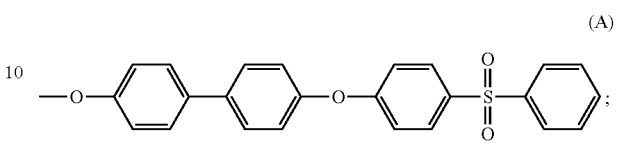

and
  from 5 to 75% wt. of at least one reinforcing filler, wherein the reinforcing filler is a fibrous filler,
  and wherein all % wt. are based on the total weight of the composition (C).

Unfilled PEI polymer/PPSU polymer composition have been disclosed for instance in WO 00/60009. It has been found that the addition of the PEI polymer to the poly(biphenyl ether sulfone) PS-R resin (i.e. RADEL® R polyphenylsulfone PPSU polymer) in an amount of even 25 parts by weight (pbw), based on the combined weight of the poly(biphenyl ether sulfone) resin and PEI resin, detrimentally affects the excellent impact properties of the poly(biphenyl ether sulfone) resin (i.e. PPSU polymer), in particular the Notched Izod impact value (ft-lb/in) is sharply reduced from a value of 14.8 to 2.2 upon adding said 25 pbw of PEI. Additionally, as shown in detail in the experimental part, the blending of PEI polymer and PPSU polymer does not result in a synergetic effect for the tensile and flexural properties. This being said, the experimental values obtained for the tensile and flexural strength and tensile and flexural modulus correspond approximately to the theoretical predictions.

WO 2009/009525 also describes unfilled PEI polymer/PPSU polymer blends comprising 25 to 90 weight percent of a polyetherimide (PEI), in particular Ultem® 1000 PEI resin and 10 to 75 weight percent of a polyphenylene ether sulfone, in particular the RADEL® R 5100 PPSU polymer. Said unfilled PEI polymer/PPSU polymer blends despite being phase separated were surprisingly clear with a % transmission of >70% and % haze of less than 10%.

As it will be explained in more detail in the specification, with reference notably to the working experiments, the Applicant has surprisingly found that the addition of PEI polymer to reinforced PPSU polymer mixtures, as detailed above, is particularly effective in inducing a much stronger effect of the reinforcing filler on the mechanical properties of the corresponding compositions, when said reinforcing filler is of fibrous nature, preferably glass fiber or carbon fiber. The Applicant has found that combining a blend of PEI polymer and PPSU polymer with the fibrous filler, as detailed above, provides for significantly improved properties over those expected by merely additive contributions of single components, clearly showing a synergetic effect, in particular in strength and modulus when using carbon fiber reinforcing fillers, and/or impact resistance, tensile elongation and strength when using glass fiber reinforcing fillers.

Composition (C)

In a preferred embodiment of the present invention, the total weight of the PEI and the PPSU polymer, based on the total weight of the composition (C), is advantageously equal to or above 30%, preferably equal to or above 40%; more preferably equal to or above 50%, even more preferably equal to or above 60%, and most preferably equal to or above 70%.

The total weight of the PEI and the PPSU polymer, based on the total weight of the composition (C), is advantageously equal to or below 95%, preferably equal to or below 90% and more preferably equal to or below 85%.

Excellent results were obtained when the composition (C) comprised the PEI and the PPSU polymer in an amount of 60-90 wt. %, based on the total weight of the composition (C).

In the rest of the text, the expression "PEI polymer" is understood, for the purposes of the present invention, both in the plural and the singular, that is to say that the inventive composition may comprise one or more than one PEI polymer. It is understood that the same applies for the expressions "PPSU polymer" and the "reinforcing filler".

PEI Polymer

For the purpose of the present invention, a polyetherimide is intended to denote any polymer of which more than 50 wt. % of the recurring units (R1) comprise at least one aromatic ring, at least one imide group, as such and/or in its amic acid form, and at least one ether group [recurring units (R1a)].

Recurring units (R1a) may optionally further comprise at least one amide group which is not included in the amic acid form of an imide group.

The recurring units (R1) are advantageously selected from the group consisting of following formulae (I), (II), (III), (IV) and (V), and mixtures thereof:

(R1a-1)

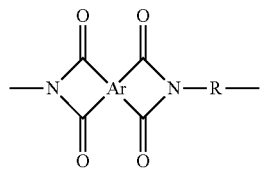

formula (I)

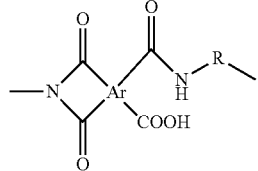

formula (II)

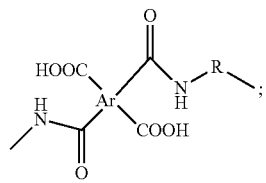

formula (III)

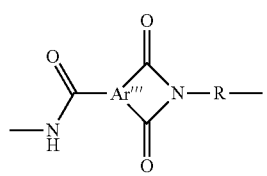

(IV)

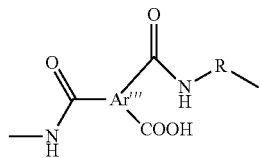

-continued (V)

wherein
Ar is a tetravalent aromatic moiety and is selected from the group consisting of a substituted or unsubstituted, saturated, unsaturated or aromatic monocyclic and polycyclic group having 5 to 50 carbon atoms;
Ar''' is a trivalent aromatic moiety and is selected from the group consisting of a substituted or unsubstituted, saturated, unsaturated or aromatic monocyclic and polycyclic group having 5 to 50 carbon atoms and
R is selected from the group consisting of substituted or unsubstituted divalent organic radicals, and more particularly consisting of (a) aromatic hydrocarbon radicals having 6 to 20 carbon atoms and halogenated derivatives thereof; (b) straight or branched chain alkylene radicals having 2 to 20 carbon atoms; (c) cycloalkylene radicals having 3 to 20 carbon atoms, and (d) divalent radicals of the general formula (VI):

(VI)

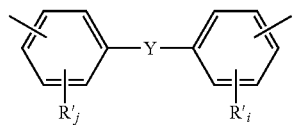

wherein Y is selected from the group consisting of alkylenes of 1 to 6 carbon atoms, in particular —C(CH$_3$)$_2$ and —C$_n$H$_{2n}$— (n being an integer from 1 to 6); perfluoroalkylenes of 1 to 6 carbon atoms, in particular —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R' is selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and i and j equal or different from each other, are independently 0, 1, 2, 3 or 4.

with the provisio that at least one of Ar, Ar''' and R comprise at least one ether group wherein said ether group is present in the polymer chain backbone.

Preferably, Ar is selected from the group consisting of those complying with the following formulae:

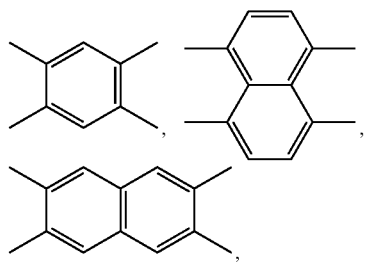

,

-continued

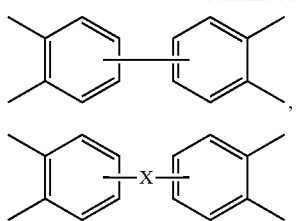

wherein X is a divalent moiety, having divalent bonds in the 3,3', 3,4', 4,3'' or the 4,4' positions and is selected from the group consisting of alkylenes of 1 to 6 carbon atoms, in particular —C(CH$_3$)$_2$ and —C$_n$H$_{2n}$— (n being an integer from 1 to 6); perfluoroalkylenes of 1 to 6 carbon atoms, in particular —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, or X is a group of the formula O—Ar''—O—; and wherein Ar'' is selected from the group consisting of those complying with following formulae (VII) to (XIII), and mixtures thereof:

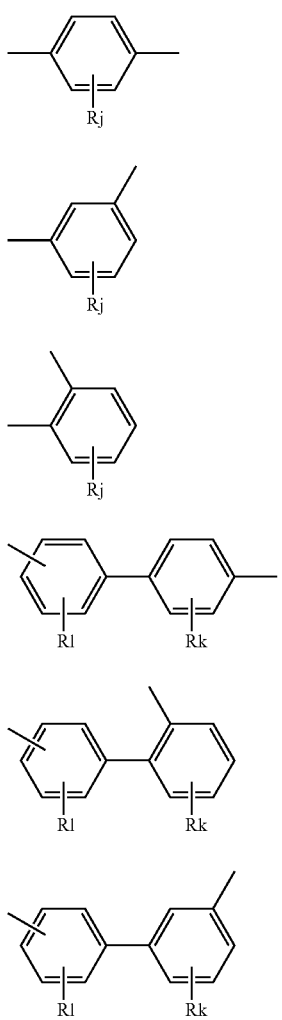

(VII)
(VIII)
(IX)
(X)
(XI)
(XII)

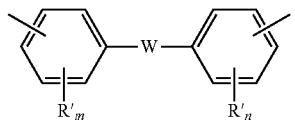

(XIII)

wherein R and R', equal or different from each other, are independently selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k, l, n and m equal or different from each other, are independently 0, 1, 2, 3 or 4, and W is selected from the group consisting of alkylenes of 1 to 6 carbon atoms, in particular —C(CH$_3$)$_2$ and —C$_n$H$_{2n}$— (with n being an integer from 1 to 6); perfluoroalkylenes of 1 to 6 carbon atoms, in particular —C(CF$_3$)$_2$ and —C$_n$F$_{2n}$— (with n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; and —SO—.

Preferably, Ar''' is selected from the group consisting of those complying with the following formulae:

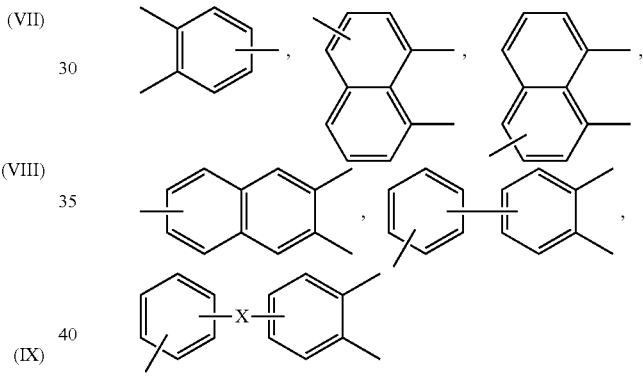

wherein X has the same meaning as defined above.

In a preferred specific embodiment, the recurring units (R1a) are selected from the group consisting of units of formula (XIV) in imide form, of corresponding units in amic acid forms of formulae (XV) and (XVI), and of mixtures thereof:

(XIV)

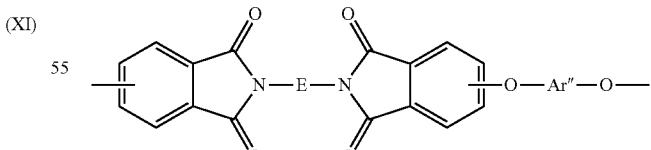

(XV)

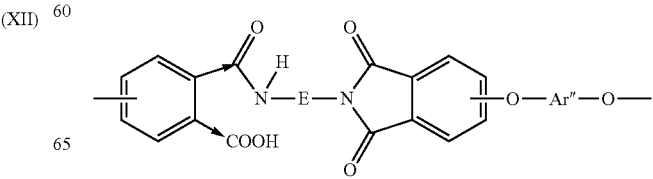

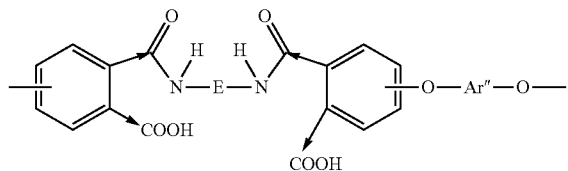

wherein:
the → denotes isomerism so that in any recurring unit the groups to which the arrows point may exist as shown or in an interchanged position;
Ar″ is selected from the group consisting of those complying with following formulae (VII) to (XIII)

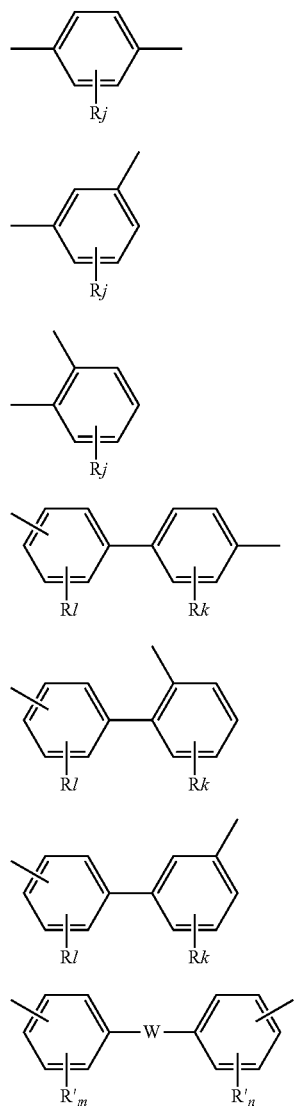

wherein R and R′, equal or different from each other, are independently selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k, l, n and m equal or different from each other, are independently 0, 1, 2, 3 or 4, and W is selected from the group consisting of alkylenes of 1 to 6 carbon atoms, in particular —C(CH$_3$)$_2$— and —C$_n$H$_{2n}$— (n being an integer from 1 to 6); perfluoroalkylenes of 1 to 6 carbon atoms, in particular —C(CF$_3$)$_2$— and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; and —SO—;

E is selected from the group consisting of —C$_n$H$_{2n}$— (n being an integer from 1 to 6), divalent radicals of the general formula (VI), as defined above, and those complying with formulae (XVII) to (XXII)

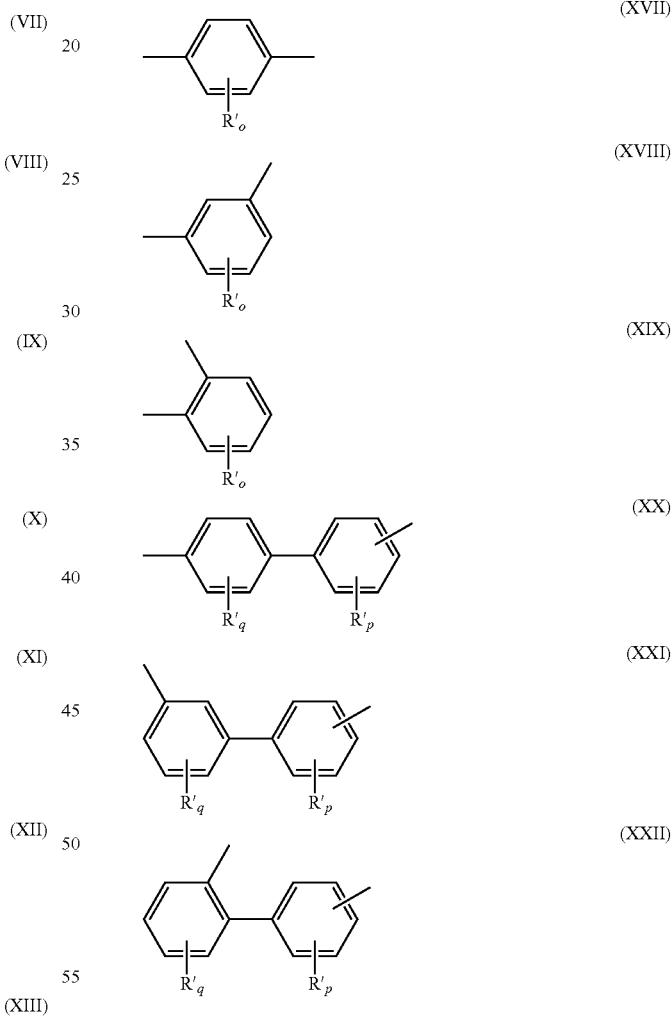

wherein R′ is selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and o, p, and q equal or different from each other, are independently 0, 1, 2, 3 or 4, Preferably, E is selected from the group consisting of those complying with formulae (XVII) to (XIX), as defined above, more preferably, E is selected from the group consisting of unsubstituted m-phenylene and unsubstituted p-phenylene, and mixtures thereof.

Preferably, Ar" is of the general formula (XIII), as detailed above; more preferably, Ar" is

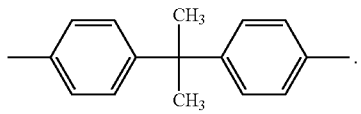

The polyetherimides wherein the recurring units (R1) are recurring units of formula (XIV) as such, in imide form, and/or in amic acid forms [formulae (XV) and (XVI)], as defined above, may be prepared by any of the methods well-known to those skilled in the art including the reaction of any aromatic bis(ether anhydride)s of the formula

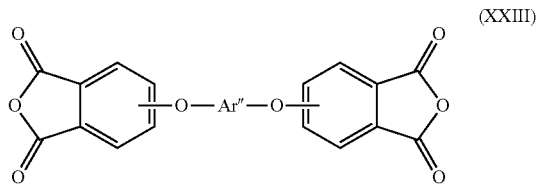
(XXIII)

where Ar" is as defined hereinbefore, with a diamino compound of the formula

H$_2$N-E-NH$_2$ (XXIV)

where E is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° C. to about 250° C.

Alternatively, these polyetherimides can be prepared by melt polymerization of any dianhydrides of formula (XXIII) with any diamino compound of formula (XXIV) while heating the mixture of the ingredients at elevated temperatures with concurrent intermixing.

The aromatic bis(ether anhydride)s of formula (XXIII) include, for example:

2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4 (3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)diphenyl-2,2-propane dianhydride; etc. and mixtures of such dianhydrides.

The organic diamines of formula (XXIV) include, for example, m-phenylenediamine, p-phenylenediamine, 2,2-bis(p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, and mixtures thereof.

In a preferred embodiment, the organic diamines of formula (XXIV) is chosen from a group selected from m-phenylenediamine and p-phenylenediamine and mixture thereof.

In a most preferred embodiment, the recurring units (R1a) are recurring units selected from the group consisting of those of formula (XXV) in imide form, their corresponding amic acid forms of formulae (XXVI) and (XXVII), and mixtures thereof:

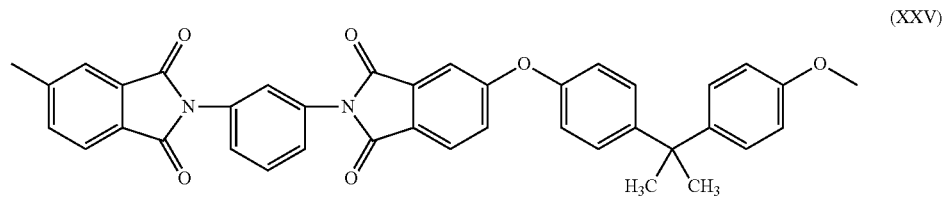
(XXV)

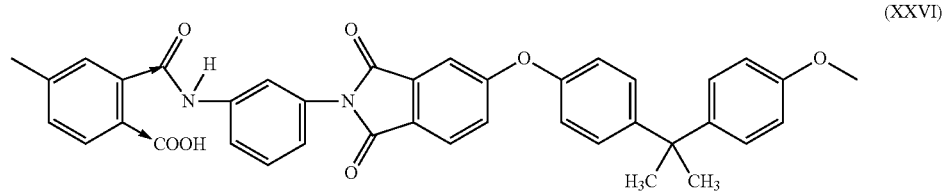
(XXVI)

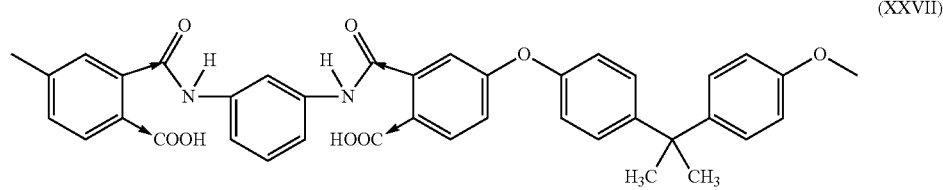
(XXVII)

wherein in formulae (XXVI) and (XXVII) the → denotes isomerism so that in any recurring unit the groups to which the arrows point may exist as shown or in an interchanged position.

In another most preferred embodiment, the recurring units (R1a-4) are recurring units selected from the group consisting of those of formula (XXVIII) in imide form, their corresponding amic acid forms of formulae (XXIX) and (XXX), and mixtures thereof:

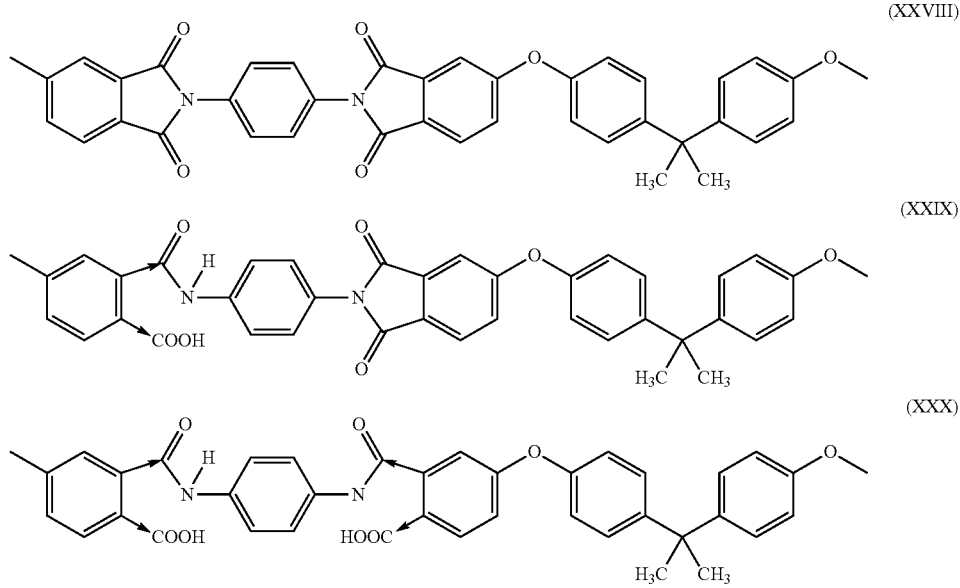

wherein in formulae (XXIX) and (XXX) the → denotes isomerism so that in any recurring unit the groups to which the arrows point may exist as shown or in an interchanged position.

Preferably more than 75% by moles and more preferably more than 90% by moles of the recurring units of the PEI are recurring units (R1). Still more preferably, essentially all, if not all, the recurring units of the PEI are recurring units (R1).

In a preferred embodiment of the present invention, more than 75% by moles more preferably more than 90% by moles, more preferably more than 99% by moles, even more preferably all the recurring units of the PEI are recurring units selected from the group consisting of those in imide form of formula (XXV), their corresponding amic acid forms of formulae (XXVI) and (XXVII), and mixtures thereof.

In another preferred embodiment of the present invention, more than 75% by moles, more preferably more than 90% by moles, more preferably more than 99% by moles, even more preferably all the recurring units of the PEI are recurring units selected from the group consisting of those in imide form of formula (XXVIII), their corresponding amic acid forms of formulae (XXIX) and (XXX), and mixtures thereof.

Such aromatic polyimides are notably commercially available from Sabic Innovative Plastics as ULTEM® polyetherimides.

The compositions can comprise one and only one PEI. Alternatively, they can comprise two, three, or even more than three PEI.

Generally, PEI polymers useful in the present invention have advantageously a melt flow rate (MFR) ranging from 0.1 to 40 grams per 10 minute, as measured according to ASTM D1238 at 337° C. and under a load of 6.6 kg, preferably ranging from 4 to 25 grams per 10 minute, as measured according to ASTM D1238 at 337° C. and under a load of 6.6 kg.

In a specific embodiment, the PEI polymer has advantageously a weight average molecular weight (Mw) of 10,000 to 150,000 grams per mole (g/mole), as measured by gel permeation chromatography, using a polystyrene standard. Such PEI polymers typically have an intrinsic viscosity greater than 0.2 deciliters per gram (dl/g), beneficially 0.35 to 0.7 dl/g measured in m-cresol at 25° C.

As already mentioned above, the presence of the PEI polymer, as detailed above, is particularly effective in inducing a much stronger effect of the reinforcing filler on the mechanical properties of the composition (C).

The weight of the PEI polymer in the composition (C), based on the total weight of the PEI polymer and the PPSU polymer, is advantageously equal to or above 5%, preferably equal to or above 10%, more preferably equal to or above 20%. On the other hand, the weight of the PEI polymer, based on the total weight of the PEI polymer and the PPSU polymer, is advantageously equal to or below 90%, preferably equal to or below 80%, more preferably equal to or below 70%, more preferably equal to or below 60%, more preferably equal to or below 50% and more preferably equal to or below 40%.

The weight of the PEI polymer in the composition (C), based on the total weight of the PEI polymer and the PPSU polymer, ranges advantageously from 5-95 wt. %, preferably from 5-60 wt. %.

Very good results were obtained when the composition (C) comprised the PEI polymer in an amount of 10-50 wt. % based on the total weight of the PEI polymer and the PPSU polymer.

Excellent results were obtained when the composition (C) comprised the PEI polymer in an amount of 20-40 wt. % based on the total weight of the PEI polymer and the PPSU polymer.

Polyphenylsulfone PPSU Polymer

As said, the polymer composition (C) comprises at least one PPSU polymer.

In a preferred embodiment of the present invention, more than 75% by moles more preferably more than 90% by moles, more preferably more than 99% by moles, even more preferably substantially all the recurring units of the PPSU polymer are recurring units ($R_{PPSU}$) of formula (A), chain defects, or very minor amounts of other units might be present, being understood that these latter do not substantially modify the properties.

The PPSU polymer may be notably a homopolymer, or a copolymer such as a random or a block copolymer.

The PPSU polymer can also be a blend of the previously cited homopolymer and copolymer.

RADEL® R PPSU from Solvay Specialty Polymers USA, L.L.C. is an example of a commercially available polyphenylsulfone homopolymer.

PPSU polymers can be prepared by known methods.

The PPSU polymer has advantageously a melt flow rate (MFR) equal to or higher than 5 g/10 min at 365° C. and under a load of 5.0 kg, preferably equal to or higher than 10 g/10 min at 365° C. and under a load of 5.0 kg, more preferably equal to or higher than 14 g/10 min at 365° C. and under a load of 5.0 kg, as measured in accordance with ASTM method D1238; to measure said melt flow rate, a Tinius Olsen Extrusion Plastometer melt flow test apparatus can be used.

Upper boundary for the melt flow rate of the PPSU polymer is not critical and will be selected by the skilled in the art as a matter of routine work. It is nevertheless understood that when the PPSU polymer possibly comprised in the composition (C) possesses advantageously a melt flow rate of at most 100 g/10 min, preferably at most 60 g/10 min, more preferably at most 40 g/10 min.

According to certain embodiments, the composition (C) will comprise a PPSU polymer having a melt flow rate of 40 g/10 min or less, preferably of 30 g/10 min or less: in other words, the PPSU polymer of this embodiment will have a melt flow rate, measured as above detailed, ranging from at least 10 g/10 min to 45 g/10 min or less, preferably ranging from at least 14 g/10 min to 40 g/10 min or less. RADEL® R PPSU is an example of a PPSU polymer suitable for being used in this embodiment.

The PPSU polymer weight average molecular weight can be 20,000 to 100,000 grams per mole (g/mol) as determined by gel permeation chromatography using ASTM D5296 with polystyrene standards. In some embodiments the PPSU polymer weight average molecular weight can be 40,000 to 80,000 grams per mole (g/mol).

In the polymer composition (C), the PPSU polymer is present in an amount of advantageously at least 10 wt. %, more preferably at least 20 wt. %, and still more preferably at least 30 wt. %, based on the total weight of the polymer composition (C).

The PPSU polymer is also present in an amount of advantageously at most 90 wt. %, preferably at most 85 wt. %, and more preferably at most 80 wt. %, based on the total weight of the polymer composition (C).

Fibrous Reinforcing Fillers

For the purpose of the present invention, the term "fibrous reinforcing filler" means a fundamental form of solid (often crystalline) characterized by relative high tenacity and a high ratio of length to diameter.

Preferably, the reinforcing fibrous filler is selected from glass fiber; carbon fibers such as notably graphitic carbon fibers (some of them having possibly a graphite content of above 99%), amorphous carbon fibers, pitch-based carbon fibers (some of them having possibly a graphite content of above 99%), PAN-based carbon fibers; synthetic polymeric fiber; aramid fiber; aluminum fiber; aluminum silicate fibers; oxide of metals of such aluminum fibers; titanium fiber; magnesium fiber; boron carbide fibers; rock wool fiber; steel fiber; asbestos; wollastonite fibers; silicon carbide fibers; boron fibers, grapheme fibers, carbon nanotubes (CNT) fibers and the like.

It is understood that the skilled person will easily recognize the reinforcing filler which fits best its composition and encompassed end uses. Generally, the reinforcing filler is chosen depending on its chemical nature, its length, diameter, ability to feed nicely in compounding equipment without bridging and surface treatment (notably because good interfacial adhesion between the reinforcing filler and the polymer improves the strength and the toughness of the blend).

Reinforcing fibrous fillers can be in a woven, non-woven, non-crimped, unidirectional or multiaxial textiles or chopped form.

In one embodiment, the reinforcing fibrous filler in the polymer composition (C) is a glass fiber.

Glass fibers are made from silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers. The glass fibers have generally an equivalent diameter of 5 to 20 preferably of 5 to 15 μm and more preferably of 5 to 10 μm. All glass fiber types, such as A, C, D, E, M, S-2, R, T glass fibers (as described in chapter 5.2.3, pages 43-48 of *Additives for Plastics Handbook,* 2nd ed, John Murphy), or any mixtures thereof or mixtures thereof may be used. For example, R, S and S2 and T glass fibers are high modulus glass fibers that have typically an elastic modulus of at least 76, preferably at least 78, more preferably at least 80, and most preferably at least 82 GPa as measured according to ASTM D2343.

E, R, S and S2 and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 50-75 wt. % of $SiO_2$, from 16-28 wt. % of $Al_2O_3$ and from 4-14 wt. % of MgO. To the contrary of the regular E-glass fibers widely used in polymer compositions, R, S2 and T glass fibers comprise less than 15 wt. % of CaO.

In one specific embodiment, the fibrous filler, in particular the glass fiber, has a diameter preferably below 40 μm, more preferably, its diameter is below 20 μm, and still more preferably below 15 μm. On the other hand, the diameter of the fibrous filler, in particular the glass fiber, is preferably above 5 μm.

In one embodiment, the fibrous filler, in particular the glass fiber, has a length preferably of below 20 mm, more preferably below 10 mm. Besides, it has a length of preferably above 1 mm, more preferably above 2 mm.

It is understood that above mentioned length and diameter values of the said fibrous fillers will change upon processing the composition (C) of the present invention.

In another embodiment, the glass fiber may be a fabric glass fiber, in particular a wool glass fiber or a textile glass fiber.

In general, wool fiberglass fibers are made in the form of a mat which can be further cut into bats. The formation of wool fiberglass mat from glass fibers, a process known in the art as "forming", includes a simultaneous spraying of a chemical binder on a fiber, as they are created. Said fiber can be created by for example, the rotary spin process, in which centrifugal force causes molten glass to flow through small holes in the wall of a rapidly rotating cylinder to create fibers that are broken into pieces by an air stream or in a flame attenuation process, molten glass flows by gravity from a furnace through numerous small orifices to create threads that are then attenuated (stretched to the point of breaking) by high velocity, hot air, and/or a flame. After the glass fibers are created (by either process) and sprayed with the binder solution, they can be collected by gravity on a conveyor belt in the form of a mat. The binder is typically a thermosetting resin that holds the glass fibers together. Although the binder composition varies with product type, typically the binder consists of a solution of phenol-formaldehyde resin, water, urea, lignin, silane, and ammonia. Coloring agents may also be added to the binder.

The textile glass fibers are in general made in the form of a continuous filament or as staple length. Typically, in the staple process the glass cullet is melted electrically and the molten glass pours from orifices beneath the furnace. High-pressure jets of steam or air may tear the stream of glass and draw the particles into long smooth fibers. On the contrary, the process of making fiberglass as a continuous filament is different from the staple fiber process. The continuous filament form is unique in that the glass is drawn continuously to indefinite lengths, the molten glass is typically forced through heated platinum bushings containing numerous very small openings. The continuous fibers emerging from the openings can be drawn over a roller applicator, which can apply a coating of a water-soluble sizing and/or coupling agent. The coated fibers can then be gathered and wound into a spindle. The spindles of glass fibers can next be conveyed to a drying oven, where moisture is removed from the sizing and coupling agents. The spindles are then sent to an oven to cure the coatings.

Especially well-suited reinforcing fillers are Owens-Corning Vetrotex® 910A chopped fiberglass and equivalents thereof.

In another embodiment, the reinforcing fibrous filler in the polymer composition (C) is a carbon fiber.

For the purpose of the present invention, the term "carbon fiber" is intended to include graphitized, partially graphitized and ungraphitized carbon reinforcing fibers or a mixture thereof.

The term "graphitized" intends to denote carbon fibers obtained by high temperature pyrolysis (over 2000° C.) of carbon fibers, wherein the carbon atoms place in a way similar to the graphite structure.

Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials.

Carbon fibers useful for the present invention are preferably chosen from the group composed of PAN-based carbon fibers (PAN-CF), pitch based carbon fibers, graphitized pitch-based carbon fibers, and mixtures thereof.

PAN-based carbon fibers (PAN-CF) have advantageously a diameter of between 3 to 20 μm, preferably from 4 to 15 μm, more preferably from 5 to 10 μm, most preferably from 6 to 8 μm. Good results were obtained with PAN-based carbon fibers (PAN-CF) having a diameter of 7 μm.

The PAN-CF maybe of any length. In general, the length of PAN-CF is at least 50 μm.

Graphitized pitch-based carbon fibers are readily available from commercial sources containing at least about 50% weight graphitic carbon, greater than about 75% weight graphitic carbon, and up to substantially 100% graphitic carbon. Highly graphitic carbon fiber particularly suitable for use in the practice of this invention may be further characterized as highly conductive, and such fiber is generally used having a modulus of about 80 to about 120 million pounds per square inch, i.e., million lbs/in$^2$ (MSI). In certain embodiments the highly graphitic carbon fiber has a modulus of about 85 to about 120 MSI, and in other certain embodiments about 100 to about 115 MSI.

The pitch-based-CF has advantageously a diameter between 5 to 20 μm, preferably from 7 to 15 μm, more preferably from 8 to 12 μm.

The pitch-based-CF may be of any length. The pitch-based-CF has advantageously a length from 1 μm to 1 cm, preferably from 1 μm to 1 mm, more preferably from 5 μm to 500 μm and still more preferably from 50 to 150 μm.

Carbon fiber may be employed as a continuous fiber, in particular unidirectional or cross-ply continuous fiber, woven tows of fibers, a chopped carbon fiber or in a particulate form such as may be obtained by milling or comminuting the fiber.

Alternatively, other types of continuous fiber systems based on woven cloth, which provides reinforcement in two orthogonal directions, or non-crimp fabrics can be suitable for use in the practice of the invention.

Comminuted graphitized pitch-based carbon fiber suitable for use in the practice of the invention may be obtained from commercial sources including from Cytec Carbon Fibers as ThermalGraph DKD X and CKD X grades of pitch-based carbon fiber and Mitsubishi Carbon Fibers as Dialead carbon fibers. Chopped PAN-based carbon fibers preferably used in the present invention may be obtained from commercial sources.

In another embodiment, the reinforcing fibrous filler in the polymer composition (C) is a wollastonite.

In other embodiment, the fillers are non-fibrous. Preferably, the reinforcing filler is selected from talc, mica, titanium dioxide, kaolin, calcium carbonate, calcium silicate, magnesium carbonate.

In one embodiment of the present invention, the reinforcing filler is advantageously present in the polymer composition (C) in an amount ranging from 10 wt. % to 70 wt. %, preferably from 15 wt. % to 70 wt. %, based on the total weight of the polymer composition (C).

In specific preferred embodiment, the fibrous reinforcing filler comprised in the polymer composition (C) is selected from a group consisting of a carbon fiber and glass fiber and said fibrous reinforcing filler is present in an amount of advantageously at least 5 wt. %, preferably at least 10 wt. %, more preferably at least 15 wt. %, based on the total weight of the polymer composition (C). On the other side, the fibrous reinforcing filler is also present in an amount of advantageously at most 70 wt. %, preferably at most 60 wt. %, preferably at most 50 wt. %, and more preferably at most 45 wt. %, based on the total weight of the polymer composition (C).

Other Ingredients

The polymer composition (C) may further optionally comprise one or more than one additional ingredient (I) generally selected from the group consisting of (i) colorants such as notably a dye (ii) pigments such as notably titanium dioxide, zinc sulfide and zinc oxide (iii) light stabilizers, e.g. UV stabilizers (iv) heat stabilizers (v) antioxidants such as notably organic phosphites and phosphonites, (vi) acid scavengers (vii) processing aids (viii) nucleating agents (ix) internal lubricants and/or external lubricants (x) flame retardants (xi) smoke-suppressing agents (x) anti-static agents (xi) anti-blocking agents (xii) conductivity additives such as notably carbon black and carbon nanofibrils.

When one or more than one additional ingredient (I) are present, their total weight, based on the total weight of polymer composition (C), is usually below 20%, preferably below 10%, more preferably below 5% and even more preferably below 2%.

The composition (C) of the invention is preferably consisting essentially of the PEI polymer, as detailed above, the PPSU polymer, as detailed above, the reinforcing filler, as detailed above, and optionally, one or more than one additional ingredient (I), as detailed above.

For the purpose of the present invention, the expression "consisting essentially of" is to be understood to mean that any additional component different from the PEI polymer, as detailed above, the PPSU polymer, as detailed above, the reinforcing filler, as detailed above, and optionally, one or more than one additional ingredient (I), is present in an amount of at most 1% by weight, based on the total weight of the composition (C), so as not to substantially alter advantageous properties of the composition.

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the PEI polymer, as detailed above, the PPSU polymer, as detailed above, the reinforcing filler, as detailed above, and optionally, one or more than one additional ingredient (I), is carried out by using high intensity mixers, such as notably Henschel-type mixers and ribbon mixers.

So obtained powder mixture can comprise the PEI polymer, as detailed above, the PPSU polymer, as detailed above, the fibrous reinforcing filler, as detailed above, and optionally, one or more than one additional ingredient (I), in the weight ratios as above detailed, suitable for obtaining finished articles by melt fabrication processes such as injection molding or extrusion, or can be a concentrated mixture to be used as masterbatch and diluted in further amounts of the PEI polymer, as detailed above, the PPSU polymer, as detailed above, the reinforcing filler, as detailed above, and optionally, one or more than one additional ingredient (I), in subsequent processing steps.

It is also possible to manufacture the composition of the invention by further melt compounding the powder mixture as above described. As said, melt compounding can be effected on the powder mixture as above detailed, or preferably directly on the PEI polymer, as detailed above, the PPSU polymer, as detailed above, the fibrous reinforcing filler, as detailed above, and optionally, one or more than one additional ingredient (I). Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents. It is advantageously possible to obtain strand extrudates which are not ductile of the composition (C) of the invention. Such strand extrudates can be chopped by means e.g. of a rotating cutting knife after some cooling time on a conveyer with water spray. Thus, for example composition (C) which may be present in the form of pellets or beads can then be further used for the manufacture of composite parts.

In one specific embodiment of the process of the invention, the composition (C) of the present invention can be further processed by following standard composite processes such as notably resin transfer molding (RTM), continuous resin transfer molding (CRTM), vacuum assisted RTM (VARTM), vacuum assisted injection moulding (VAIM), vacuum assisted processing, vacuum infusion moulding (VIM), vacuum bag curing, compression molding, Seeman Composite resin infusion (SCRIMP™), Quick-step™, resin film infusion (RFI), resin infusion under flexible tooling (RIFT), automated fiber placement, filament winding, pultrusion, thermal expansion molding, injection molding and the like, to form a composite part, a part of an article or an article.

In another specific embodiment of the invention, the composition (C) of the present invention can suitably be used to provide prepregs thereby using conventional techniques. Typically, said prepregs can then be molded using for example autoclave or out-of-autoclave processes to form composite parts and laminates.

Another aspect of the present invention is related to a composite part comprising the above described composition (C).

An aspect of the present invention also provides an article comprising at least one composite part comprising the composition (C), as detailed above, which provides various advantages over prior art parts and articles, in particular in strength and modulus when using carbon fiber reinforcing fillers in said composition (C), and/or impact resistance, tensile elongation and strength when using glass fiber reinforcing fillers in said composition (C).

The articles according to the invention can be fabricated by processing the polymer composition (C) as above described following the standard composite processes, as described above.

Another aspect of the present invention is related to articles comprising the above described polymer composition (C).

Thus, the polymer composition (C) is notably very well suited for the manufacture of articles useful in a wide variety of end uses.

Non limitative examples of articles according to the present invention are:
  plumbing articles used for the transportation of water or other fluids under pressure such as fittings, rings, faucets, valves and manifolds. Common applications thereof include domestic hot and cold water, radiator heating systems, floor and wall heating and cooling systems, compressed air systems and piping systems for natural gas;

medical/dental/healthcare articles such as medical instruments or parts of instruments (notably handles and viewing glasses), components of medical equipments that handle or dispense chemicals used in medical procedures (such as anesthesia), cases and trays used to hold such instruments;

aircraft interiors articles such as panels and components (duct elements, structural brackets, fasteners, cabin interior components or other light or medium duty structural elements and components) on aircraft;

food service articles such as warming trays, steam table trays, plastic cook ware;

dairy equipment articles such as piping systems used for the collection or transportation of milk and other dairy products;

laboratory animal cages;

laboratory equipment articles such as funnels, filter devices and other lab equipment;

electronic articles such as structural parts of electronic devices electric and electromagnetic wire insulation coatings mobile electronics structural and or other functional elements and components parts for automotive under-the-hood uses that encounter elevated temperatures and/or aggressive chemical environments parts and components for pumping and delivery of chemicals, solvents, oils or organic fluids at room temperature and elevated temperatures. This includes piping and fittings used in the chemical process industry and in hydraulics and in heat transfer fluid delivery systems.

Should the disclosure of any patents, patent applications, and publications which are incorporated herein by reference conflict with the description of the present application to the extent that it may render a term unclear, the present description shall take precedence

EXAMPLES

The invention will be now described in more details with reference to the following examples, whose purpose is merely illustrative and not intended to limit the scope of the invention.

Raw Materials

RADEL® R 5800 PPSU [MFR (365° C./5 kg) is in the range from 20-28 g/10 min] is a polyphenylsulfone PPSU homopolymer from Solvay Specialty Polymers USA, L.L.C.

ULTEM® 1000 [MFR (337° C./6.6 kg) is about 9 g/10 min] is a polyetherimide PEI from Sabic Innovative Plastics.

OCV™ 910A chopped fiberglass from Owens-Corning Vetrotex

Sigrafil C® C-30 S006 chopped carbon fiber commercially available from the SGL Group—The Carbon Company.

General Description of Compounding Process

Both the PEI polymer and the PPSU polymer were fed to the first barrel of a ZSK-26 twin screw extruder comprising 12 zones via a loss in weight feeder. The barrel settings were in the range of 340-380° C. and the resins were melted before zone 7. The reinforcing filler, i.e carbon fiber or glass fiber was fed at zone 7 through a side stuffer via a loss in weight feeder. The screw rate was 200 rpm. The extrudates were cooled and pelletized using conventional equipment.

Mechanical Testing

The mechanical properties of all the polymer compositions (C) prepared were tested according to ASTM standards at 23° C. and 50% relative humidity.

Tensile data (strength, modulus and elongation) were determined according to ASTM D638.

Flexural strength and modulus were determined according to ASTM D790.

Notched and un-notched Izod impact data were generated following D 256 standard.

High speed puncture properties were measured according to D3763.

ASTM tensile and flex bars were molded by injection molding using the standard molding conditions recommended for PPSU and PEI polymers.

Drying at 150° C. during 2 h 30 min. Barrel temperature from 320 to 350° C. from back to front. Melt temperature from 350 to 390° C.

For the preparation of the test specimen, in particular 1) Type I tensile bars, 2) 5 inch×0.5 inch×0.125 inch flexural bars, and 3) 4 inch×4 inch×0.125 inch plaques for the instrumented impact (Dynatup) testing.

The mechanical properties are summarized in Tables 1 to 3.

Table 1 summarizes the mechanical properties of PEI/PPSU/carbon fiber compositions having 30% by weight of carbon fiber and comparative unfilled PEI/PPSU compositions.

Table 2 summarizes the mechanical properties of PEI/PPSU/glass fiber compositions having 30% by weight of glass fiber and comparative unfilled PEI/PPSU compositions.

Table 3 summarizes the mechanical properties of PEI/PPSU/carbon fiber compositions having variable amounts of carbon fiber.

Tables 1 to 3 also report for each of the mechanical properties, as listed above, the theoretical predicted value which were calculated using the common rule of mixing, and by using the appropriate equation $$(\text{Property})_{composite} = (\text{Property})_{PPSU} * V_{PPSU} + (\text{Property})_{PEI} * V_{PEI} + (\text{Property})_{fiber} * V_{fiber}$$

wherein the term "Property" is the experimental value for each of the corresponding mechanical property.

$V_{PPSU}$ is the volume fraction of the PPSU polymer, $V_{PEI}$ is the volume fraction of the PEI polymer and $V_{fiber}$ is the volume fraction of the PEI polymer.

It is further understood that when the fiber content is kept constant, the rule of mixing can be expressed by following equation:

$$(\text{Property})_{composite} = (\text{Property})_{fiber\ reinforced\ PPSU} * \sigma_{PPSU} + (\text{Property})_{fiber\ reinforced\ PEI} * \sigma_{PEI}$$

where $\sigma_{PPSU}$ and $\sigma_{PEI}$ are the volume fraction of the PPSU polymer and the PEI polymer of the matrix ($\sigma_{PPSU} + \sigma_{PEI} = 1$).

For the purpose of the present invention, the equation was further simplified to the use of weight fractions instead of volume fractions as the density of the PPSU and the PEI polymer are very similar. Thus, following equation was used $$(\text{Property})_{composite} = (\text{Property})_{fiber\ reinforced\ PPSU} * W_{PPSU} + (\text{Property})_{fiber\ reinforced\ PEI} * W_{PEI}$$

where $W_{PPSU}$ and $W_{PEI}$ are the weight fractions of the PPSU polymer and the PEI polymer, based on the total weight of the PPSU polymer and the PEI polymer in composition (C) ($W_{PPSU}$ and $W_{PEI} = 1$).

TABLE 1

| | Examples No | | | | | | | |
|---|---|---|---|---|---|---|---|---|
| | C1 | C2 | E3 | C4 | E5 | E6 | C7 | E8 |
| RADEL ® R 5800 PPSU (wt %) | 100 | 70 | 66.5 | 95 | 63 | 56 | 80 | 42 |
| ULTEM ® 1000 PEI (wt. %) | — | — | 3.5 | 5 | 7 | 14 | 20 | 28 |
| Sigrafil C ® C-30 S006 carbon fiber (wt %) | — | 30 | 30 | — | 30 | 30 | — | 30 |
| Tensile Strength (psi) | 11100 | 24800 | 26100 | 11400 | 26800 | 28200 | 12400 | 30000 |
| Theoretical Tensile Strength (psi)[a] | — | — | 25230 | 11380 | 25660 | 26520 | 12220 | 28240 |
| Tensile Modulus (ksi) | 340 | 2760 | 2740 | 352 | 2820 | 3050 | 375 | 3090 |
| Theoretical Tensile Modulus (ksi)[a] | — | — | 2791 | 348 | 2821 | 2882 | 371 | 3004 |
| Tensile Elongation (%) | — | — | 2.2 | — | 2.1 | 2 | — | 1.9 |
| Theoretical Tensile Elongation (%)[a] | — | — | 2.1 | — | 2.1 | 2.0 | — | 1.9 |
| Flexural Strength (psi) | 14200 | 38000 | 40300 | 14600 | 41200 | 43200 | 15600 | 45100 |
| Theoretical Flexural Strength (psi)[a] | — | — | 38450 | 14555 | 38900 | 39800 | 15620 | 41600 |
| Flexural Modulus (psi) | 354000 | 2500000 | 2590000 | 362000 | 2660000 | 2730000 | 379000 | 2830000 |
| Theoretical Flexural Modulus (psi)[a] | — | — | 2527000 | 360900 | 2554000 | 2608000 | 381600 | 2716000 |
| Notched Izod Impact (ft-lb/in) | — | 1.52 | 1.52 | 10.80 | 1.51 | 1.44 | 2.53 | 1.42 |
| Theoretical Notched Izod Impact(ft-lb/in)[a] | — | — | 1.50 | 11.80 | 1.50 | 1.50 | 10.11 | 1.40 |
| Un-Notched Izod Impact (ft-lb/in) | 12.4 | 12.4 | 12.4 | — | 12 | 12.1 | — | 12.7 |
| Theoretical Um-Notched Izod (ft-lb/in)[a] | — | — | 12.4 | — | 12.3 | 12.3 | — | 12.1 |
| High Speed Puncture, Energy | — | — | — | 38.6 | — | — | 43.5 | — |
| Theoritical Energy[a] | — | — | — | 39.9 | — | — | 40.7 | — |

| | Examples No | | | | | | |
|---|---|---|---|---|---|---|---|
| | C9 | E10 | C11 | E12 | C13 | C14 | C15 |
| RADEL ® R 5800 PPSU (wt %) | 60 | 28 | 40 | 14 | 20 | — | — |
| ULTEM ® 1000 PEI (wt. %) | 40 | 42 | 60 | 56 | 80 | 70 | 100 |
| Sigrafil C ® C-30 S006 carbon fiber (wt %) | — | 30 | — | 30 | — | 30 | — |
| Tensile Strength (psi) | 13500 | 31700 | 14700 | 32500 | 15700 | 33400 | 16700 |
| Theoretical Tensile Strength (psi)[a] | 13340 | 29960 | 14460 | 31680 | 15580 | — | — |
| Tensile Modulus (ksi) | 411 | 3190 | 437 | 3240 | 472 | 3370 | 495 |
| Theoretical Tensile Modulus (ksi)[a] | 402 | 3126 | 433 | 3248 | 464 | — | — |
| Tensile Elongation (%) | — | 1.8 | — | 1.7 | — | 1.6 | — |
| Theoretical Tensile Elongation (%)[a] | — | 1.8 | — | 1.7 | — | — | — |
| Flexural Strength (psi) | 17100 | 45600 | 18600 | 47300 | 19900 | 47000 | 21300 |
| Theoretical Flexural Strength (psi)[a] | 17040 | 43400 | 18460 | 45200 | 19880 | — | — |
| Flexural Modulus (psi) | 410000 | 2910000 | 436000 | 3000000 | 464000 | 3040000 | 492000 |
| Theoretical Flexural Modulus (psi)[a] | 409200 | 2824000 | 436800 | 2932000 | 464400 | — | — |
| Notched Izod Impact (ft-lb/in) | 1.58 | 1.37 | 1.28 | 1.31 | 1.01 | 1.27 | 0.956 |
| Theoretical Notched Izod Impact(ft-lb/in)[a] | 7.82 | 1.40 | 5.53 | 1.30 | 3.24 | — | — |
| Un-Notched Izod Impact (ft-lb/in) | — | 12 | — | 11.5 | — | 11.7 | — |
| Theoretical Um-Notched Izod (ft-lb/in)[a] | — | 12.0 | — | 11.8 | — | — | — |
| High Speed Puncture, Energy | 40.4 | — | 48.3 | — | 47.6 | — | 44.5 |
| Theoritical Energy[a] | 41.6 | — | 42.6 | — | 43.6 | — | — |

[a] calculated according to equation: (Property)$_{composite}$ = (Property)$_{fiber\ reinforced\ PPSU}$ * W$_{PPSU}$ + (Property)$_{fiber\ reinforced\ PEI}$ * W$_{PEI}$ wherein W$_{PPSU}$ and W$_{PEI}$ are the weight fractions of the PPSU polymer and the PEI polymer, based on the total weight of the PPSU polymer and the PEI polymer in composition (C) (W$_{PPSU}$ and W$_{PEI}$ = 1).

TABLE 2

| | Examples No | | | | | | | |
|---|---|---|---|---|---|---|---|---|
| | C1 | C15 | E16 | C4 | E17 | E18 | C7 | E19 |
| RADEL ® R 5800 PPSU (wt %) | 100 | 70 | 66.5 | 95 | 63 | 56 | 80 | 42 |
| ULTEM ® 1000 PEI (wt. %) | — | — | 3.5 | 5 | 7 | 14 | 20 | 28 |
| OCV ™ 910A chopped fiberglass (wt %) | — | 30 | 30 | — | 30 | 30 | — | 30 |
| Tensile Strength (psi) | 11100 | 17700 | 19100 | 11400 | 19900 | 20500 | 12400 | 22600 |
| Theoretical Tensile Strength (psi)[a] | — | — | 18120 | 11380 | 18540 | 19380 | 12220 | 21060 |
| Tensile Modulus (ksi) | 340 | 1260 | 1270 | 352 | 1270 | 1260 | 375 | 1390 |
| Theoretical Tensile Modulus (ksi)[a] | — | — | 1273 | 348 | 1285 | 1310 | 371 | 1360 |
| Tensile Elongation (%) | — | 2.7 | 3.5 | — | 3.6 | 4.1 | — | 3.5 |
| Theoretical Tensile Elongation (%)[a] | — | — | 2.7 | — | 2.7 | 2.8 | — | 2.8 |
| Flexural Strength (psi) | 14200 | 27000 | 30700 | 14600 | 32100 | 33900 | 15600 | 36400 |
| Theoretical Flexural Strength (psi)[a] | — | — | 27660 | 14555 | 28320 | 29640 | 15620 | 32280 |
| Flexural Modulus (psi) | 354000 | 1200000 | 1220000 | 362000 | 1210000 | 1220000 | 379000 | 1330000 |
| Theoretical Flexural Modulus (psi)[a] | — | — | 1212500 | 360900 | 1225000 | 1250000 | 381600 | 1300000 |
| Notched Izod Impact (ft-lb/in) | — | 1.63 | 1.97 | 10.80 | 2.16 | 2.13 | 2.53 | 2.06 |
| Theoretical Notched Izod Impact(ft-lb/in)[a] | — | — | 1.60 | 11.80 | 1.70 | 1.70 | 10.10 | 1.70 |
| Un-Notched Izod Impact (ft-lb/in) | 12.4 | 11.9 | 15.3 | — | 17 | 17.6 | — | 16.7 |
| Theoretical Um-Notched Izod (ft-lb/in)[a] | — | — | 12.0 | — | 12.2 | 12.4 | — | 13.0 |
| High Speed Puncture, Energy | — | — | 27 | 38.6 | 40 | 41 | 43.5 | 29 |
| Theoritical Energy[a] | — | 8.09 | 9.44 | 39.9 | 10.4 | 10.3 | 40.7 | 9.9 |

| | Examples No | | | | | | |
|---|---|---|---|---|---|---|---|
| | C9 | E20 | C11 | E21 | C13 | C22 | C15 |
| RADEL ® R 5800 PPSU (wt %) | 60 | 28 | 40 | 14 | 20 | — | — |
| ULTEM ® 1000 PEI (wt. %) | 40 | 42 | 60 | 56 | 80 | 70 | 100 |
| OCV ™ 910A chopped fiberglass (wt %) | — | 30 | — | 30 | — | 30 | — |
| Tensile Strength (psi) | 13500 | 24000 | 14700 | 24800 | 15700 | 33400 | 26100 |
| Theoretical Tensile Strength (psi)[a] | 13340 | 22740 | 14460 | 24420 | 15580 | — | — |
| Tensile Modulus (ksi) | 411 | 1430 | 437 | 1460 | 472 | 3370 | 1510 |
| Theoretical Tensile Modulus (ksi)[a] | 402 | 1410 | 433 | 1460 | 464 | — | — |
| Tensile Elongation (%) | — | 3.2 | — | 3.1 | — | 1.6 | 3 |
| Theoretical Tensile Elongation (%)[a] | — | 2.9 | — | 2.9 | — | — | — |
| Flexural Strength (psi) | 17100 | 37800 | 18600 | 38500 | 19900 | 47000 | 40200 |
| Theoretical Flexural Strength (psi)[a] | 17040 | 34920 | 18460 | 37560 | 19880 | — | — |
| Flexural Modulus (psi) | 410000 | 1360000 | 436000 | 1390000 | 464000 | 3040000 | 1450000 |
| Theoretical Flexural Modulus (psi)[a] | 409200 | 1350000 | 436800 | 1400000 | 464400 | — | — |
| Notched Izod Impact (ft-lb/in) | 1.58 | 1.93 | 1.28 | 1.93 | 1.01 | 1.27 | 1.90 |
| Theoretical Notched Izod Impact(ft-lb/in)[a] | 7.82 | 1.80 | 5.53 | 1.80 | 3.24 | — | — |
| Un-Notched Izod Impact (ft-lb/in) | — | 15.6 | — | 15.2 | — | 11.7 | 14.6 |
| Theoretical Um-Notched Izod (ft-lb/in)[a] | — | 13.5 | — | 14.1 | — | — | — |
| High Speed Puncture, Energy | 40.4 | 15 | 48.3 | 8 | 47.6 | — | — |
| Theoritical Energy[a] | 41.6 | 10.5 | 42.6 | 9.0 | 43.6 | — | 9.7 |

[a]calculated according to equation: (Property)$_{composite}$ = (Property)$_{fiber\ reinforced\ PPSU}$ * $W_{PPSU}$ + (Property)$_{fiber\ reinforced\ PEI}$ * $W_{PEI}$ wherein $W_{PPSU}$ and $W_{PEI}$ are the weight fractions of the PPSU polymer and the PEI polymer, based on the total weight of the PPSU polymer and the PEI polymer in composition (C) ($W_{PPSU}$ and $W_{PEI}$ = 1).

TABLE 3

|  | Examples No | | | | | | |
|---|---|---|---|---|---|---|---|
|  | C23 | C24 | E25 | C26 | C27 | E28 | C29 |
| RADEL ® R 5800 PPSU (wt %) | 95 | 0 | 71.25 | 90 | 0 | 67.5 | 80 |
| ULTEM ® 1000 PEI (wt. %) | 0 | 95 | 23.75 | 0 | 90 | 22.5 | 0 |
| OCV ™ 910A chopped fiberglass (wt %) | 5 | 5 | 5 | 10 | 10 | 10 | 20 |
| Tensile Strength (psi) | 10600 | 16900 | 13000 | 11600 | 18600 | 14700 | 15300 |
| Theoretical Tensile Strength (psi)[a] | — | — | 12175 | — | — | 13350 | — |
| Tensile Modulus (ksi) | 420 | 579 | 462 | 553 | 705 | 597 | 898 |
| Theoretical Tensile Modulus (ksi)[a] | — | — | 460 | — | — | 591 | — |
| Tensile Elongation (%) | 13 | 8.5 | 9.1 | 5.3 | 6.9 | 7.4 | 3.2 |
| Theoretical Tensile Elongation (%)[a] | — | — | 11.9 | — | — | 5.7 | — |
| Flexural Strength (psi) | 16500 | 24800 | 18900 | 19300 | 29200 | 22600 | 23900 |
| Theoretical Flexural Strength (psi)[a] | — | — | 18575 | — | — | 21775 | — |
| Flexural Modulus (psi) | 434000 | 595000 | 474000 | 537000 | 716000 | 589000 | 866000 |
| Theoretical Flexural Modulus (psi)[a] | — | — | 474250 | — | — | 581750 | — |
| Notched Izod Impact (ft-lb/in) | 2.19 | 0.84 | 1.22 | 1.32 | 1.03 | 1.40 | 1.54 |
| Theoretical Notched Izod Impact(ft-lb/in)[a] | — | — | 1.85 | — | — | 1.24 | — |
| Un-Notched Izod Impact (ft-lb/in) | — | — | — | 14.4 | 13.1 | 20.2 | 11.6 |
| Theoretical Um-Notched Izod (ft-lb/in)[a] | — | — | — | — | — | 14.0 | — |
| High Speed Puncture, Energy | 32.2 | 1.8 | 7.7 | 19.0 | 5.6 | 6.7 | 9.2 |
| Theoritical Energy[a] | — | — | 24.56 | — | — | 15.6 | — |

|  | Examples No | | | | |
|---|---|---|---|---|---|
|  | C30 | E31 | C32 | C33 | E34 |
| RADEL ® R 5800 PPSU (wt %) | 0 | 60 | 70 | 0 | 52.5 |
| ULTEM ® 1000 PEI (wt. %) | 80 | 20 | 0 | 70 | 17.5 |
| OCV ™ 910A chopped fiberglass (wt %) | 20 | 20 | 30 | 30 | 30 |
| Tensile Strength (psi) | 23100 | 18200 | 17900 | 26800 | 22200 |
| Theoretical Tensile Strength (psi)[a] | — | 17250 | — | — | 20125 |
| Tensile Modulus (ksi) | 1120 | 963 | 1300 | 1560 | 1360 |
| Theoretical Tensile Modulus (ksi)[a] | — | 954 | — | — | 1365 |
| Tensile Elongation (%) | 4 | 5.4 | 2.5 | 2.8 | 3.5 |
| Theoretical Tensile Elongation (%)[a] | — | 3.4 | — | — | 2.6 |
| Flexural Strength (psi) | 36900 | 32200 | 26800 | 40200 | 35300 |
| Theoretical Flexural Strength (psi)[a] | — | 27150 | — | — | 30150 |
| Flexural Modulus (psi) | 1080000 | 944000 | 1240000 | 1480000 | 1300000 |
| Theoretical Flexural Modulus (psi)[a] | — | 919500 | — | — | 1300000 |
| Notched Izod Impact (ft-lb/in) | 1.71 | 1.89 | 1.63 | 1.96 | 2.23 |
| Theoretical Notched Izod Impact(ft-lb/in)[a] | — | 1.58 | — | — | 1.71 |
| Un-Notched Izod Impact (ft-lb/in) | 15.0 | 17.4 | 11.2 | 15.2 | 16.6 |
| Theoretical Um-Notched Izod (ft-lb/in)[a] | — | 12.4 | — | — | 12.2 |
| High Speed Puncture, Energy | 8.83 | 10.8 | 8.2 | 9.1 | 10.6 |
| Theoritical Energy[a] | — | 9.1 | — | — | 8.4 |

[a]calculated according to equation: (Property)$_{composite}$ = (Property)$_{fiber\ reinforced\ PPSU}$ * W$_{PPSU}$ + (Property)$_{fiber\ reinforced\ PEI}$ * W$_{PEI}$ wherein W$_{PPSU}$ and W$_{PEI}$ are the weight fractions of the PPSU polymer and the PEI polymer, based on the total weight of the PPSU polymer and the PEI polymer in composition (C) (W$_{PPSU}$ and W$_{PEI}$ = 1).

The invention claimed is:

1. A composition, consisting of:
   from 1 to 90 wt. % of at least one polyetherimide polymer (PEI polymer),
   from 20 to 90 wt. % of at least one polyphenylsulfone polymer (PPSU polymer), wherein more than 50% by moles of recurring units of said PPSU polymer are recurring units (R$_{PPSU}$) of formula (A):

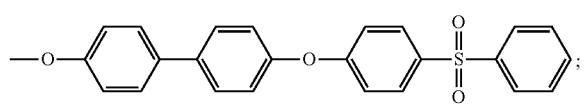

(A)

and
   from 5 to 75 wt. % of at least one reinforcing filler, wherein said reinforcing filler is a fibrous filler,
   and wherein all wt. % are based on the total weight of the composition.

2. The composition according to claim 1, wherein the total weight of the PEI polymer and the PPSU polymer in the composition is equal to or above 50 wt. %, based on the total weight of the composition.

3. The composition according to claim 1, wherein more than 50 wt. % of recurring units (R1) of the PEI polymer are recurring units (R1a) selected from the group consisting of formula (XXV) in imide form, their corresponding amic acid forms of formulae (XXVI) and (XXVII), and mixtures thereof:

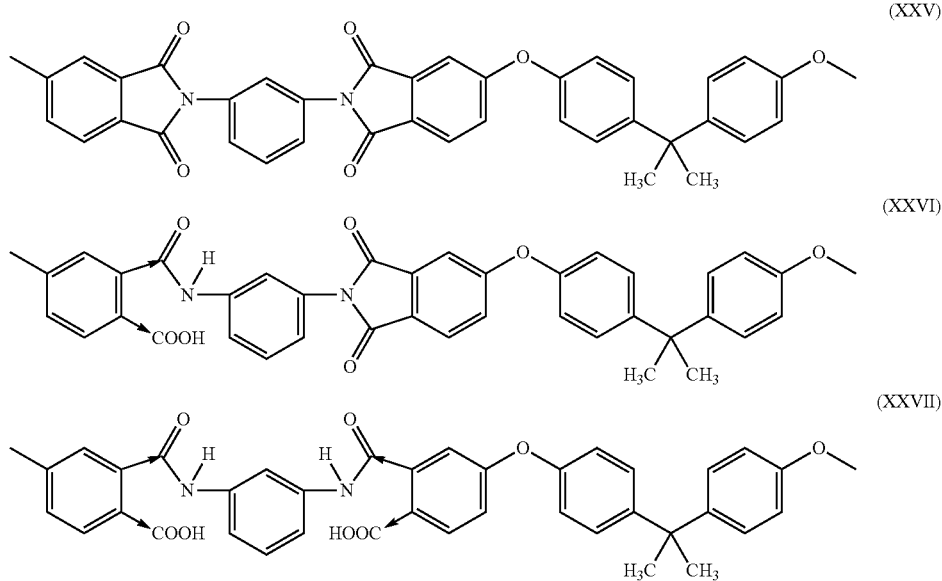

wherein in formulae (XXVI) and (XXVII) the → denotes isomerism so that in any recurring unit the two groups to which the arrows from the same aromatic ring point may exist as shown or in an interchanged position.

4. The composition according to claim 1, wherein more than 50 wt. % of recurring units (R1) of the polyetherimide polymer are recurring units (R1a-4) selected from the group consisting of those of formula (XXVIII) in imide form, their corresponding amic acid forms of formulae (XXIX) and (XXX), and mixtures thereof:

5. The composition according to claim 1, wherein the PEI polymer is present in an amount ranging from 5 to 95 wt. %, based on the total weight of the PEI polymer and PPSU polymer.

6. The composition according to claim 1, wherein the reinforcing filler is present in an amount ranging from 1 to 70 wt. %, based on the total weight of the polymer composition.

7. The composition according to claim 1, wherein the reinforcing filler is selected from the group consisting of glass fiber, carbon fiber, and combinations thereof.

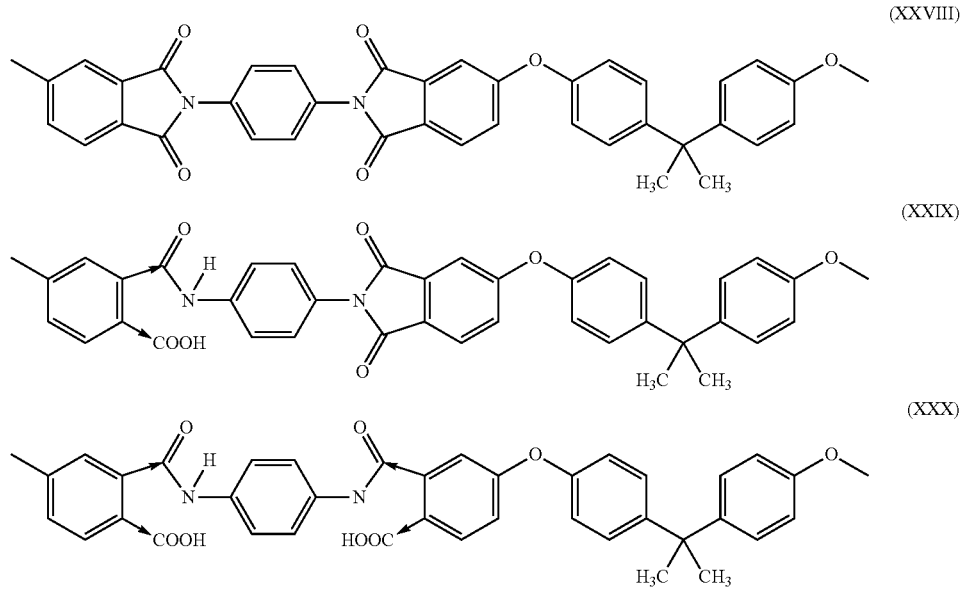

wherein in formulae (XXIX) and (XXX) the → denotes isomerism so that in any recurring unit the two groups to which the arrows from the same aromatic ring point may exist as shown or in an interchanged position.

8. The composition (C) according to claim 1, wherein the reinforcing filler is a fibrous filler selected from glass fiber having a diameter from 5 μm to 40 μm and a length from 1 mm to 20 mm, or carbon fiber.

9. A process for manufacturing the polymer composition according to claim 1, which comprises mixing:
   from 1 to 90 wt. % of the at least one polyetherimide polymer, (PEI polymer);
   from 20 to 90 wt. % of the at least one polyphenylsulfone polymer, (PPSU polymer), wherein more than 50% by moles of the recurring units of said PPSU polymer are recurring units ($R_{PPSU}$) of formula (A):

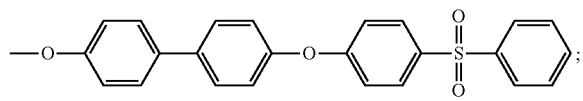

and
   from 5 to 75 wt. % of the at least one fibrous reinforcing filler,
   wherein all wt. % are based on the total weight of the composition.

10. The process according to claim 9, wherein the mixing is carried out by dry blending, slurry mixing, solution mixing, melt mixing, or a combination of dry blending and melt mixing.

11. A method of manufacturing an article, part of an article, or a composite, wherein the method comprises processing the composition of claim 1 to form the article, the part of an article, or the composite.

12. A composite part comprising the polymer composition according to claim 1.

13. An article comprising at least one of the composite part according to claim 12.

14. An article comprising the composition according to claim 1.

15. The article according to claim 14, wherein the article is a plumbing, a medical, a dental, a healthcare, an aircraft interior, a food service, a dairy equipment, a laboratory animal cage, a laboratory equipment, an electronic device, a mobile electronic part, an automotive part, or a pumping part.

* * * * *